UNITED STATES PATENT OFFICE.

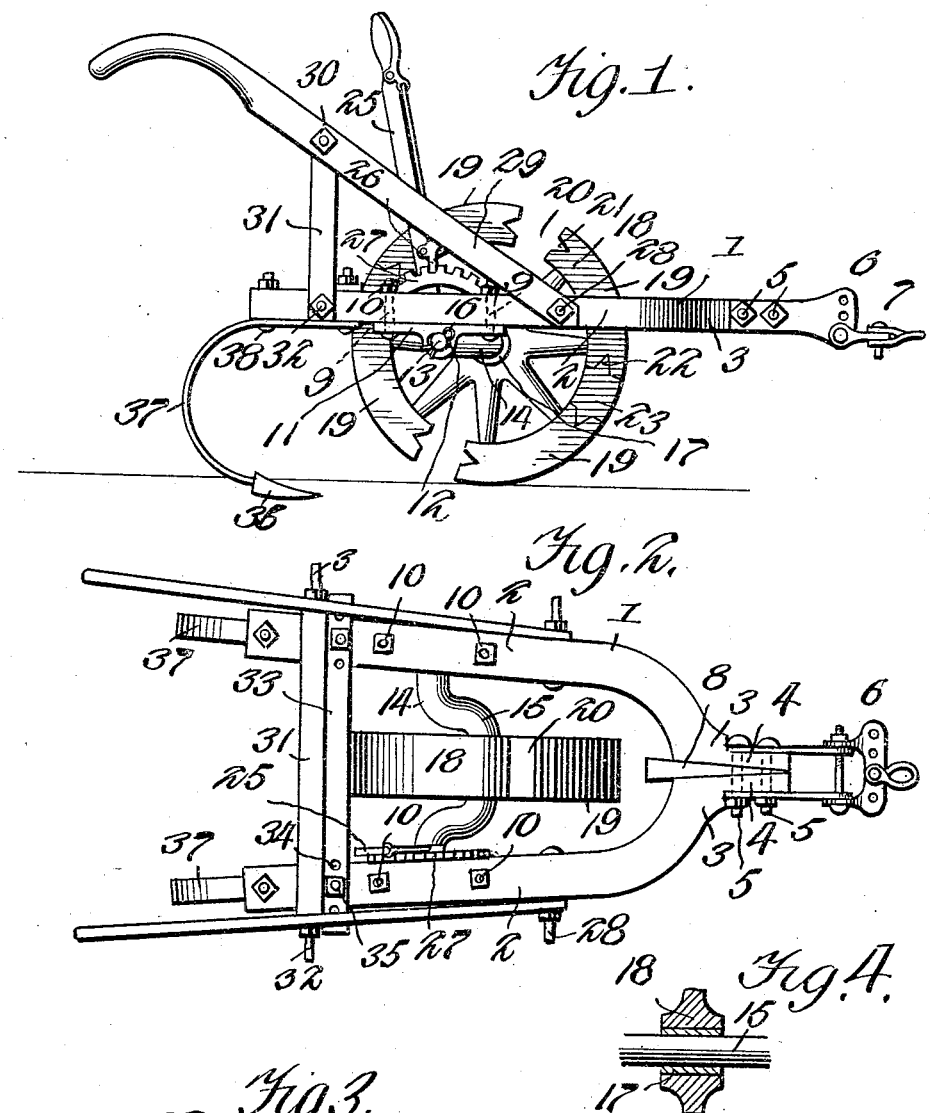

WALTER B. ESTIS, OF COFFEEVILLE, ALABAMA, ASSIGNOR OF ONE-FOURTH TO MATTIE A. THARP AND ONE-FOURTH TO JUDIE THARP, OF CUNNINGHAM, ALABAMA.

AGRICULTURAL IMPLEMENT.

939,820.

Specification of Letters Patent. Patented Nov. 9, 1909.

Application filed May 7, 1909. Serial No. 494,564.

To all whom it may concern:

Be it known that I, WALTER B. ESTIS, a citizen of the United States, residing at Coffeeville, in the county of Clarke and State of Alabama, have invented new and useful Improvements in Agricultural Implements, of which the following is a specification.

This invention relates to an agricultural implement designed primarily for thinning and cultivating cotton plants, but which may also be employed as a ground roller, plain cultivator and to cover drilled grain.

The object of the invention is to provide a simple and inexpensive construction of implement which can be adjusted to regulate the depth of penetration and distance between the covering or cultivator shovels.

The invention consists of the features of construction, combination and arrangement of parts hereinafter fully described and claimed, reference being had to the accompanying drawing, in which:—

Figure 1 is a side elevation of an agricultural implement embodying my invention. Fig. 2 is a top plan view of the same. Fig. 3 is a circumferential section through a portion of the wheel or roller. Fig. 4 is a detail transverse section through the hub of the wheel or roller.

Referring to the drawing, the numeral 1 designates the frame of the implement, which comprises a pair of rearwardly diverging companion side beams 2 having front abutting ends 3 provided with inner rearwardly inclined or diverging faces 4, said ends 3 being coupled by a pair of transverse bolts 5, which also secure the buck head 6, carrying a draft clevis 7, in position. A wedge shaped block or stripper 8 is arranged between the inclined faces 4 and is longitudinally slotted for passage of the bolts 5 and to permit said stripper to be adjusted in and out to increase or diminish the space between the forward ends of the beams for relative adjustment of the latter at a greater or less distance apart. Each beam is provided at a point somewhat in rear of its longitudinal center with a pair of spaced openings 9 for the passage of bolts 10. These bolts detachably secure in position upon the under side of the beams bearing blocks 11 each having an elongated or tapering bearing opening 12. The bearing openings 12 of the two bearing blocks, which are arranged in alinement, receive the end journals 13 of a transverse shaft 14, said shaft being provided with a central crank 15. The ends of the shaft extend beyond the bearings and are provided with openings for passage of cotter pins or the like 16 to hold the journals in proper positions.

On the crank 15 of the shaft 14 is loosely mounted a sleeve 17 on which is loosely journaled in turn a wheel or roller 18, arranged midway between the side beams of the frame. This wheel or roller preferably comprises a hub provided with radial spokes or arms carrying at their outer ends a divided rim, formed of a series of segmental sections 19, spaced by intervening recesses 20. In the present instance the wheel is divided into four such sections 19, the adjacent edges of which are provided with transverse grooves 21 adapted to receive tongues 22 on filler blocks 23 employed to close the recesses 20, set screws 24 being provided upon the ends of the sections to engage said tongues and bind said filler blocks firmly in applied position against displacement. Upon one of the spindles 13 is pivoted an adjusting lever 25 carrying a pawl 26 to engage a rack 27 fixed to the adjacent side beam 2, whereby the crank shaft 14 may be turned to raise and lower the frame to stand at different elevations, in which positions of adjustment it may be secured by engagement of the pawl with the teeth of the rack.

Bolts 28 pass transversely through the side beams in advance of the bearing blocks, and fasten in position upon the frame the forward ends of a pair of upwardly and rearwardly inclined handles 29, which are also secured by bolts 30 to the side standards of an arched brace 31 extending transversely between the beams, the lower ends of said standards being fastened to the beams in rear of the bearing blocks by transverse bolts 32. The several sets of bolts 28, 30 and 32 are of sufficient length to permit of the adjustment of the parts secured thereby when the frame beams 2 are adjusted in and out to regulate the distance between them. The elongated or conical bearing openings 12 in the bearing blocks 11 also permit relative pivotal movement of the spindles 13 therein to compensate for such adjustments of the side beams.

Extended transversely between the beams in rear of the wheel or roller is a horizontal brace plate or strip 33, which adjustably connects the rear ends of the beams 2 to maintain them in adjusted position. The ends of this plate or strip are each formed with a series of openings 34 for the passage of bolts 35 securing the same to the beams, by which adjustable connections are afforded to enable the beams to be coupled by the brace in any of their positions of adjustment. The forward edge of the brace plate bears upon the periphery of the wheel or roller, and thus serves the additional function of a scraper blade to remove from the surface of the wheel all earth and particles of plants that may adhere thereto in the use of the implement.

Each beam carries at its rear end a covering or cultivating shovel 36 carried by a bow-spring standard 37, the upper end of which is arranged beneath the beam and secured thereto by a pair of spaced bolts 38, the openings in the standard and beam being the same distance apart as the openings 9 in the beam, for a purpose hereafter described.

In the operation of the implement as a cotton thinner, the draft animal is hooked to the clevis 7 and the implement drawn along a row of plants in the field, the wheel or roller 18 operating to mash down all of those plants which underlie the sections 19 and blocks 23 to leave standing those plants which come in line with and are accommodated within the recesses 20. The shovels 35, following the wheel, serve to throw the earth over the mashed down plants and about the plants left standing, as will be readily understood, and by adjusting the frame up or down through the medium of the lever 25 the depth of penetration of said shares and the amount of earth thrown thereby may be regulated. By means of the lever the frame may also be elevated to a proper height to raise the shovels above the surface of the ground, to allow the implement to be transported from place to place without injury to the shovels. It will be understood that the number of spaces 20, left unfilled by the filler blocks 23 will depend upon the distance it is desired to leave the standing plants apart. In a wheel or roller measuring 48 inches in circumference and provided with four of such recesses 20, arranged an equal distance apart, it will be understood that by removing all of the filler blocks the plants may be left standing 12 inches apart, by closing two of the openings at diametrically opposite sides by the use of filler blocks the plants may be left standing 24 inches apart, and by closing all but one recess the plants may be left standing 48 inches apart. Thus the distance between the thinned out or standing plants may be readily and conveniently controlled by the operator, by the use of the filler blocks 23, which may be conveniently applied and removed by a lateral sliding motion and secured in position by the set screws 24. If desired, all of the openings 20 may be filled by the filler block to make the service of the wheel or roller continuous, so that the implement may be employed for rolling the ground, mashing down weeds and covering drilled seed, thus adapting the implement for a variety of uses.

It will be understood that the shovels 35 may be arranged a greater or less distance apart by slacking the nuts of the bolts 5 and adjusting the wedge 8 in or out, adjusting the handles and brace 33 correspondingly by proper arrangement of the bolts and nuts thereof, and then tightening the nuts of the bolts 5 to fix the wedge in adjusted position. The implement may be converted into a cultivator by simply detaching one of the bearing blocks 11, removing the shaft and wheel from the frame by slipping the shaft out of engagement with the other bearing block, and then removing and re-applying the standard of the share on the same side as the removed block in the position formerly occupied by said block, the securing bolts 38 passing through the openings 9, as will be readily understood, thus fastening one cultivator shovel to the plow in advance of the other.

From the foregoing description, the construction and mode of use of my invention will be readily understood and it will be seen that it provides a simple and inexpensive construction of implement which may be effectively used as a cotton thinner and employed for various other purposes.

Having thus fully described the invention, what is claimed as new, is:—

1. In a cotton thinner, a roller having a rim formed of spaced sections, laterally movable filler blocks adapted to fit within the spaces between the sections, the meeting edges of the sections and filler blocks having interengaging portions, and means coacting with said interengaging portions for securing said filler blocks to said rim sections.

2. In a cotton thinner, a roller having a rim formed of spaced sections, the meeting edges of the sections being provided with transverse grooves, laterally movable filler blocks having tongues adapted to fit within said grooves to close the spaces between the sections, and means for securing said filler blocks to said rim sections.

3. In a cotton thinner, a roller having a rim formed with spaced sections, the meeting edges of the sections being provided with transverse grooves, laterally movable filler blocks having tongues adapted to fit within said grooves to close the spaces between the sections, and set screws upon the rim sections arranged to project into the grooves and engage the tongues of the blocks.

In testimony whereof I affix my signature in presence of two witnesses.

WALTER B. ESTIS.

Witnesses:
 JOE. WIGGINS,
 W. L. WHITE.